United States Patent
Du et al.

(10) Patent No.: US 8,989,310 B2
(45) Date of Patent: Mar. 24, 2015

(54) METHOD, DEVICE AND SYSTEM FOR COMPLEX CARRIER MODULATION

(75) Inventors: Fanping Du, Shenzhen (CN); Junyi Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/641,374

(22) PCT Filed: May 30, 2011

(86) PCT No.: PCT/CN2011/074932
§ 371 (c)(1),
(2), (4) Date: Oct. 15, 2012

(87) PCT Pub. No.: WO2012/048573
PCT Pub. Date: Apr. 19, 2012

(65) Prior Publication Data
US 2013/0034174 A1 Feb. 7, 2013

(30) Foreign Application Priority Data
Oct. 16, 2010 (CN) .......................... 2010 1 0540478

(51) Int. Cl.
*H04L 27/36* (2006.01)
*H04L 27/20* (2006.01)
(52) U.S. Cl.
CPC .......... *H04L 27/362* (2013.01); *H04L 27/2057* (2013.01)
USPC ......................................... 375/302; 375/295

(58) Field of Classification Search
USPC ........................................................ 375/302
See application file for complete search history.

(56) References Cited

U.S. PATENT DOCUMENTS

| | | | |
|---|---|---|---|
| 7,627,058 B2* | 12/2009 | Poberezhskiy | 375/308 |
| 8,693,586 B2* | 4/2014 | Du et al. | 375/340 |

(Continued)

FOREIGN PATENT DOCUMENTS

| | | |
|---|---|---|
| CN | 101179545 A | 5/2008 |
| CN | 101640660 A | 2/2010 |
| CN | 101771657 A | 7/2010 |

OTHER PUBLICATIONS

International Search Report in international application No. PCT/CN2011/074932, mailed on Sep. 8, 2011.

(Continued)

*Primary Examiner* — Erin File
(74) *Attorney, Agent, or Firm* — Oppedahl Patent Law Firm LLC

(57) ABSTRACT

A method, device and system for complex carrier modulation are provided in the disclosure, wherein $e^{-i\omega t}$ or $e^{i\omega t}$ is used as a carrier frequency to perform carrier modulation on a to-be-carried signal. The modulated signal transmitted in a medium is a rotating complex signal. The method can enable right and left frequency bands to carry independent information. Therefore the spectrum utility ratio is improved. Employing the method for complex carrier modulation provided in the disclosure can use the right and left frequency spectrum resources adequately, and the loss of signal energy is small, therefore the capacity of a channel is improved greatly.

22 Claims, 16 Drawing Sheets

(56) References Cited

U.S. PATENT DOCUMENTS

| | | | |
|---|---|---|---|
| 2003/0112370 A1* | 6/2003 | Long et al. | 348/474 |
| 2003/0156014 A1* | 8/2003 | Kodama et al. | 340/310.01 |
| 2009/0067833 A1* | 3/2009 | Bunge et al. | 398/43 |
| 2010/0027690 A1* | 2/2010 | Liang et al. | 375/260 |
| 2011/0051783 A1* | 3/2011 | Cahn et al. | 375/146 |
| 2012/0034887 A1* | 2/2012 | McCallister et al. | 455/127.1 |
| 2013/0259113 A1* | 10/2013 | Kumar | 375/233 |

OTHER PUBLICATIONS

English Translation of the Written Opinion of the International Search Authority in international application No. PCT/CN2011/074932, mailed on Sep. 8, 2011.

Analog Devices, AD9777 16-Bit,160 MSPS 2x/4x/8x Interpolating Dual TxDAC+® D/A Converter, Rev.0, Dec. 31, 2002. (48 pages).

* cited by examiner

Fig. 3

| E-UTRA Operating Band | Uplink (UL) operating band BS receive UE transmit | | | Downlink (DL) operating band BS transmit UE receive | | | Duplex Mode |
|---|---|---|---|---|---|---|---|
| | $F_{UL\_low}$ | – | $F_{UL\_high}$ | $F_{DL\_low}$ | – | $F_{DL\_high}$ | |
| 1 | 1920MHz | – | 1980 MHz | 2110MHz | – | 2170 MHz | FDD |
| 2 | 1850 MHz | – | 1910 MHz | 1930 MHz | – | 1990 MHz | FDD |
| 3 | 1710 MHz | – | 1785 MHz | 1805 MHz | – | 1880 MHz | FDD |
| 4 | 1710 MHz | – | 1755 MHz | 2110 MHz | – | 2155 MHz | FDD |
| 5 | 824 MHz | – | 849 MHz | 869 MHz | – | 894MHz | FDD |
| 6 | 830 MHz | – | 840 MHz | 875 MHz | – | 885 MHz | FDD |
| 7 | 2500 MHz | – | 2570 MHz | 2620 MHz | – | 2690 Hz | FDD |
| 8 | 880 MHz | – | 915 MHz | 925 MHz | – | 960 MHz | FDD |
| 9 | 1749.9 MHz | – | 1784.9MHz | 1844.9 MHz | – | 1879.9MHz | FDD |
| 10 | 1710 MHz | – | 1770 MHz | 2110 MHz | – | 2170MHz | FDD |
| 11 | 1427.9 MHz | – | 1452.9MHz | 1475.9 MHz | – | 1500.9MHz | FDD |
| 12 | 698 MHz | – | 716 MHz | 728 MHz | – | 746 MHz | FDD |
| 13 | 777 MHz | – | 787 MHz | 746 MHz | – | 756 MHz | FDD |
| 14 | 788 MHz | – | 798 MHz | 758 MHz | – | 768 MHz | FDD |
| 17 | 704 MHz | – | 716 MHz | 734 MHz | – | 746 MHz | FDD |
| ... | | | | | | | |
| 33 | 1900 MHz | – | 1920MHz | 1900 MHz | – | 1920 MHz | TDD |
| 34 | 2010 MHz | – | 2025MHz | 2010 MHz | – | 2025 MHz | TDD |
| 35 | 1850 MHz | – | 1910MHz | 1850 MHz | – | 1910 MHz | TDD |
| 36 | 1930 MHz | – | 1990MHz | 1930 MHz | – | 1990 MHz | TDD |
| 37 | 1910 MHz | – | 1930MHz | 1910 MHz | – | 1930 MHz | TDD |
| 38 | 2570 MHz | – | 2620MHz | 2570 MHz | – | 2620 MHz | TDD |
| 39 | 1880 MHz | – | 1920MHz | 1880 MHz | – | 1920 MHz | TDD |
| 40 | 2300 MHz | – | 2400MHz | 2300 MHz | – | 2400 MHz | TDD |

METHOD, DEVICE AND SYSTEM FOR COMPLEX CARRIER MODULATION

TECHNICAL FIELD

The present disclosure relates to a modulation method, and more particularly to a method, device and system for complex carrier modulation.

BACKGROUND

According to Shannon formula $C=W \cdot \log_2^{(1+S/N)}$, where C is a channel capability, W is channel bandwidth, S is signal power and N is noise power, it can be seen that the channel capability is proportional to the bandwidth, therefore the most effective way to improve the channel capability is to increase the bandwidth. In addition, it can be seen that the channel capability can be also improved by increasing the signal power.

In a current communication system, different information is carried to different frequency bands by using carrier modulation technologies and transmitted on the frequency bands, the essence of which is to fully utilize bandwidth resources to improve the channel capability. FIG. 1 shows a current typical carrier modulation principle. The real part and the imaginary part of a baseband complex signal are respectively multiplied by carriers $\cos(\omega t)$ and $\sin(\omega t)$, accumulated and then transmitted. This process can be expressed by the following formula: $s_{BP}(t)=\text{Re}\{s_{LP}(t)e^{i\omega t}\}$, where $s_{BP}(t)$ is a carrier modulated signal, $e^{i\omega t}$ is a complex carrier signal, $s_{LP}(t)$ is a baseband complex signal and Re represents to take the real part. The principle of this formula is that the multiplication of time domain signals is equal to convolution of frequency domain signals, and a baseband signal is shifted to a carrier frequency band via a convolution process of a carrier frequency signal and the baseband signal. Obviously, in the current carrier modulation method, although a baseband signal is presented by a complex number and a carrier signal is also represented by a complex number, what is transmitted finally is only the real part of a carrier modulated signal. Therefore, the real signal is transmitted, which is called real carrier modulation herein.

Actually, the current real carrier modulation method has multiplied the waste of frequency spectrum resources and the loss of signal energy, mainly because of the lack of a proper understanding and improper use of negative frequencies.

Firstly, negative frequencies do exist. As shown in FIG. 2, an angle of counterclockwise rotation is defined as $+\theta$, and an angle of clockwise rotation is defined as $-\theta$, then it can be learned based on the definition $$\omega = \frac{d\theta}{dt}$$

of an angular frequency that a negative angular frequency $$-\omega = \frac{d(-\theta)}{dt}$$

is generated by a "negative angle" instead of a "negative time". Therefore, as a matter of fact, the positive and negative frequencies only represent that there are rotations in two different directions on a plane. In essence, the positive and negative rotations exist because the plane has two surfaces. The positive frequencies whose rotation directions accord with a right-hand rule are defined as right rotating frequencies herein which are called right frequencies for short. The negative frequencies whose rotation directions accord with a left-hand rule are defined as left rotating frequencies herein which are called left frequencies for short. Unless otherwise referred to, the positive and negative frequencies, the positive and negative frequency bands, and the positive and negative spectrums etc. in the existing technologies are replaced with terms such as left and right frequencies, left and right frequency bands, and left and right spectrums etc. hereinafter.

So far, whether in teaching materials or in engineering implementation, the defined available bandwidths (also known as work frequency bands) are within the range of right spectrums with positive signs, while left spectrums are abandoned selectively because of the negative signs in the mathematical expressions. As shown in FIG. 3 (protocol contents, the original text of which is English), frequency spectrum resources with negative signs are completely neglected even in the frequency band division of the most cutting-edge Long Term Evolution (LTE) communication protocol.

While understanding the natural existence of left frequencies, how to distinguish the left and right frequencies, or how to describe these two rotations on a plane? Euler's formula gives the answer: $e^{\pm i\omega t}=\cos(\omega t)\pm i\sin(\omega t)$. As shown in FIG. 4, $e^{-i\omega t}$ and $e^{i\omega t}$ represent a clockwise rotation curve and a counterclockwise rotation curve respectively, corresponding to the left and right frequency signals. Although the left and right frequency signals can be easily distinguished in a "time-complex number" space, the projections of the left and right frequency signals are all real signals $\cos(\omega t)$ apparently on a "time-real part" plane, i.e. $\text{Re}\{e^{-i\omega t}\}=\text{Re}\{e^{+i\omega t}\}=\cos(\omega t)$. Therefore, when a real signal appears, it cannot be distinguished whether it is the projection of a left frequency signal or the projection of a right frequency signal. Speaking from the probability, a left frequency signal and a right frequency signal is probabilistically-equivalent, i.e. both the probability of a left frequency signal and the probability of a right frequency signal are 1/2, i.e. $\cos(\omega t)=(e^{-i\omega t}+e^{+i\omega t})/2$. Therefore, real signals with only one degree of freedom are incomplete. Unambiguous description of a frequency signal at least requires a complex signal with two degrees of freedom. In other words, a complete description of a frequency signal should be in a complex-number form. In the complete description, the left and right frequencies $e^{-i\omega t}$ and $e^{i\omega t}$ in the complex-number form are two completely independent distinguishable frequencies and can carry completely independent information.

As analyzed above, real signals generated by real carrier modulation actually cause ambiguity of left and right frequencies, thus the left and right frequency bands are both occupied, and information on the left and right frequency bands are in conjugate symmetry and not independent. FIG. 5 shows a spectrum shifting in real carrier modulation, wherein the abscissa represents a frequency $\omega$, the ordinate represents amplitude $F(\omega)$ and $\omega_C$ represents a carrier frequency. By the way, in the real carrier modulation mode, since two-dimensional complex signals are observed from incomplete one-dimensional real signals, a left frequency band caused by the real carrier modulation mode has brought great confusion to persons who do not know the meaning and function of the left frequency band, and may be erroneously assumed to be only a mirror image which does not really exist. A more serious point of view regards signals of the left frequency band harmful, thus bringing about many methods such as "mirror image inhibition", and etc.

Currently, received signals are regarded as real signals during demodulation, therefore multiplication, i.e. frequency band shifting is performed for real signals only. Generally, a right frequency band is shifted to a baseband. In this way, a left frequency band is shifted to a position which is distant doubly from the baseband, and all information of the left frequency band is erased after being filtered by the baseband. Although the mirror image information of the left frequency band is redundant, the loss is multiplied actually when the mirror image information is abandoned directly. FIG. 6 shows a spectrum shifting in real carrier demodulation, wherein the abscissa represents a frequency ω, the ordinate represents amplitude F(ω) and $ω_C$ represents a carrier frequency. FIG. 7 shows an energy loss in a process from transmitting a signal to receiving the signal. A complete complex signal is a left-rotating or right-rotating plane signal (a); after the signal undergoes the grating effect (b) of real carrier modulation, and the projection effect (c) of a receiving antenna, the loss of the actually received signal energy may be quadrupled or more. Luckily, such incomplete real carrier demodulation is applied because the information carried in the left and right frequencies is conjugate mirror information, thus it is the same to receive the information on the left frequency even if a demodulation end is confused with the left and right frequencies. It only needs to exchange the I and Q data to mirror the information back, that's why many instruments are provided with an option for performing I, Q exchange for received signals.

It can be seen from the frequency band shifting process in the modulation and demodulation above that a frequency is actually a relative value which changes with the change of a reference frequency. The reference frequency here refers to a modulation and demodulation frequency and only the distance between the frequencies, i.e. the frequency band has an absolute meaning, which proves the actual existence of "negative frequencies" from another perspective.

To sum up, because of the natural bias to a left frequency, frequency spectrum resources of the left frequency are neglected by wireless, wire, optical fiber, radar and other bandwidth definitions in all current communication systems, thus half of the frequency spectrum resources are wasted. At the same time, the current real carrier modulation also make the left and right frequency bands occupied and the current real carrier demodulation also make the left frequency signal energy or the right frequency signal energy abandoned.

SUMMARY

To solve the problem above, the disclosure provides a method, device and system for complex carrier modulation.

To solve the technical problem above, the disclosure provides a method for complex carrier modulation, including: using a complex signal as a carrier signal to modulate a to-be-carried signal to obtain a complex carrier modulated signal, wherein the complex carrier signal is $e^{-iωt}$ or $e^{iωt}$.

Furthermore, the complex carrier modulated signal may be a complex signal, including a real part signal and an imaginary part signal; furthermore, the real part signal and the imaginary part signal may be maintained to be transmitted vertically in a space of a transmission medium; furthermore, in the step of using a complex signal as a carrier signal to modulate a to-be-carried signal, a following formula may be adopted: $s_{BP}(t)=s_{LP}(t)e^{-iωt}$, wherein the $s_{BP}(t)$ represents the complex carrier modulated signal, the $s_{LP}(t)$ represents the to-be-carried signal, the $e^{-iωt}$ represents a left rotating complex carrier signal, and a range of a value of the frequency −ω is from 0 to −∞; furthermore, a rotation direction of the left rotating complex carrier signal may accord with a left-hand rule; furthermore, in the step of using a complex signal as a carrier signal to modulate a to-be-carried signal, a following formula may be adopted: $s_{BP}(t)=s_{LP}(t)e^{iωt}$, wherein the $s_{BP}(t)$ represents the complex carrier modulated signal, the $s_{LP}(t)$ represents the to-be-carried signal, the $e^{iωt}$ represents a right rotating complex carrier signal, and a range of a value of the frequency +ω is from 0 to +∞; furthermore, a rotation direction of the right rotating complex carrier signal may accord with a right-hand rule; furthermore, $e^{-iω_1t}$ may be adopted to modulate a first to-be-carried signal, and $e^{iω_2t}$ may be adopted to modulate a second to-be-carried signal, wherein $ω_1=ω_2$, and the first to-be-carried signal and the second to-be-carried signal are independent information.

To solve the technical problem above, the disclosure provides a device for complex carrier modulation which is configured to use a complex signal as a carrier signal to modulate a to-be-carried signal $s_{BP}(t)$ to obtain a complex carrier modulated signal; wherein the complex carrier signal is $e^{-iωt}$ or $e^{iωt}$.

To solve the technical problem above, the disclosure provides a system for complex carrier modulation/demodulation, including a complex carrier modulation device and a complex carrier demodulation device, wherein the complex carrier modulation device is configured to use a complex signal as a carrier signal to modulate a to-be-carried signal to obtain a complex carrier modulated signal; wherein the complex carrier signal is $e^{-iωt}$ or $e^{iωt}$.

To solve the technical problem above, the disclosure provides a device for complex carrier demodulation, which is configured to use a complex signal as a carrier signal to demodulate a modulated signal to obtain a complex carrier demodulated signal; wherein the complex carrier signal is $e^{-iωt}$ or $e^{iωt}$.

To solve the technical problem above, the disclosure provides a device for complex carrier demodulation, which is configured to use a complex signal as a carrier signal to demodulate a modulated signal to obtain a complex carrier demodulated signal, the complex carrier signal being $e^{-iωt}$ or $e^{iωt}$; and the device specifically includes a complex carrier demodulated signal real part modulation unit and a complex carrier demodulated signal imaginary part modulation unit.

Furthermore, when a modulation end uses a right rotating complex carrier, the demodulation device may use a left rotating complex carrier to perform demodulation. The real part modulation unit may include a first multiplier, a second multiplier and a first accumulator; wherein he first multiplier is configured to multiply a real part of a to-be-carried signal with cos(ωt) the second multiplier is configured to multiply an imaginary part of the to-be-carried signal with −sin(ωt), and the first accumulator is configured to perform accumulation. The imaginary part modulation unit includes a third multiplier, a fourth multiplier and a second accumulator; wherein the third multiplier is configured to multiply the real part of the to-be-carried signal with sin(ωt), the fourth multiplier is configured to multiply the imaginary part of the to-be-carried signal with cos(ωt) and the second accumulator is configured to perform accumulation; furthermore, when the modulation end uses a left rotating complex carrier, the demodulation device may apply right rotating complex carrier demodulation. The real part modulation unit may include a first multiplier, a second multiplier and a first accumulator; wherein the first multiplier is configured to multiply a real part of a to-be-carried signal with cos(ωt), the second multiplier is configured to multiply an imaginary part of the to-be-carried signal with sin(ωt), and the first accumulator is configured to perform accumulation. The imaginary part modulation unit includes a third multiplier, a fourth multiplier and a second accumulator; wherein the third multiplier is configured to multiply the real part of the to-be-carried signal with −sin (ωt), fourth multiplier is configured to multiply the imaginary part of the to-be-canted signal with cos(ωt) and the second accumulator configured to perform accumulation.

To solve the technical problem above, the disclosure provides a system for complex carrier modulation/demodulation, including a complex carrier modulation device and a real carrier demodulation device, wherein the complex carrier modulation device is configured to use a complex signal as a carrier signal to modulate a to-be-carried signal to obtain a complex carrier modulated signal, and the complex carrier signal is $e^{-i\omega t}$ or $e^{i\omega t}$.

To solve the technical problem above, the disclosure provides a system for complex carrier modulation/demodulation, including a real carrier modulation device and a complex carrier demodulation device, wherein the complex carrier demodulation device is configured to use a complex signal as a carrier signal to demodulate a modulated signal to obtain a complex carrier demodulated signal, and the complex carrier signal is $e^{-i\omega t}$ or $e^{i\omega t}$.

To solve the technical problem above, the disclosure provides a system for transmitting a complex carrier modulated signal, including a real part signal transmission unit and an imaginary part signal transmission unit; wherein the real part signal transmission unit is configured to transmit a real part signal in a complex carrier modulated signal, the imaginary part signal transmission unit is configured to transmit an imaginary part signal in the complex carrier modulated signal, and the real part signal and the imaginary part signal are spatially vertical.

Furthermore, the real part signal transmission unit and the imaginary part signal transmission unit are linearly polarized antennae vertical to each other in a space; or the real part signal transmission unit and the imaginary part signal transmission unit form a circularly polarized antenna.

A device for receiving a complex carrier modulated signal is provided, including a real part signal receiving unit and an imaginary part signal receiving unit. The real part signal receiving unit is configured to receive a real part signal in a complex carrier modulated signal, the imaginary part signal receiving unit is configured to receive an imaginary part signal in the complex carrier modulated signal, and the real part signal and the imaginary part signal are spatially vertical. Furthermore, the real part signal receiving unit and the imaginary part signal receiving unit are linearly polarized antennae vertical to each other in a space; or the real part signal receiving unit and the imaginary part signal receiving unit form a circularly polarized antenna.

Firstly, compared with real carrier modulation, complex carrier modulation uses a complex signal $e^{\pm i\omega t}$ which is described completely as a carrier signal to modulate a to-be-carried signal, thus the left and right frequency bands can carry information independently, and fully use the frequency spectrum resources; secondly, since a transmitted signal in the complex carrier modulation is a rotating complex signal, the signal strength, i.e. the modulus of a complex number is a fixed value, thus avoiding loss of signal energy; finally, compared with real carrier demodulation, complex carrier demodulation uses a complex signal $e^{\pm i\omega t}$ which is described completely as a carrier signal to demodulate a modulated signal, thus being capable of independently demodulating the information on the left and right frequency bands. Therefore, the spectrum utilization ratio achieved using the methods for complex carrier modulation and demodulation of the disclosure doubles the spectrum utilization ratio obtained using methods for real carrier modulation and demodulation, and the signal energy can also be maintained better.

To sum up, the disclosure provides methods for complex carrier modulation and demodulation, which can make a full use of the right and left frequency spectrum resources, and involve a small loss of signal energy, thereby greatly improving the capacity of a channel.

BRIEF DESCRIPTION OF THE DRAWINGS

The accompanying drawings illustrated here provide further understanding to the disclosure and constitute a part of the application. The exemplary embodiments of the disclosure and the descriptions thereof are used for explaining the disclosure, instead of constituting an improper limitation to the disclosure. In the accompanying drawings:

FIG. 3 shows division of bandwidths in an LTE communication protocol;

DETAILED DESCRIPTION

The disclosure will be described in details below with reference to the accompanying drawings and in combination with the embodiments. It should be noted that, if there is no conflict, the embodiments of the application and the characteristics in the embodiments can be combined with one another.

The disclosure is based on the following principle: a frequency signal is described completely in the form of a complex number, i.e. $e^{-i\omega t}$ or $e^{i\omega t}$. The complete description is as follows: $e^{-i\omega t}$ and $e^{i\omega t}$ are two distinguishable frequencies, and therefore can carry independent information. According to the principle, the disclosure uses $e^{-i\omega t}$ or $e^{i\omega t}$ as a carrier signal, and $e^{-i\omega t}$ is called a left rotating carrier signal and $e^{i\omega t}$ is called a right rotating complex carrier signal.

A method for complex carrier modulation comprises: using a complex signal as a carrier signal to modulate a to-be-carried signal to obtain a complex carrier modulated signal. The complex carrier signal is $e^{-i\omega t}$ or $e^{i\omega t}$.

Figure 8:
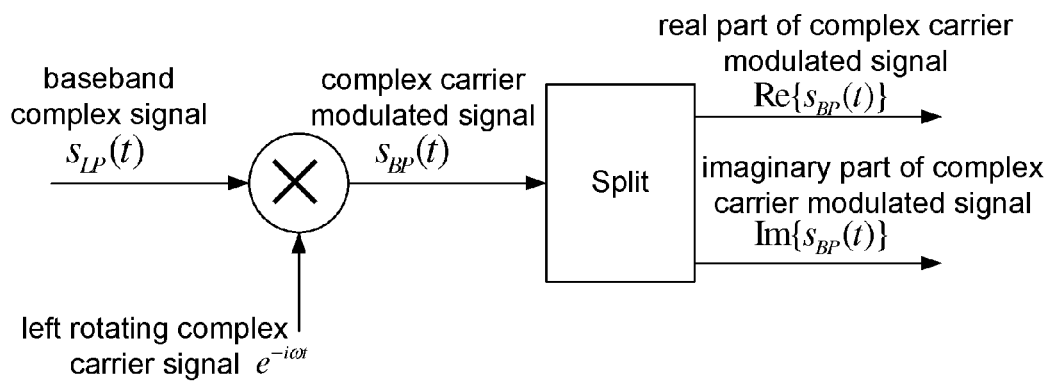
FIG. 8 shows a principle of left rotating complex carrier modulation.
Figure 9:
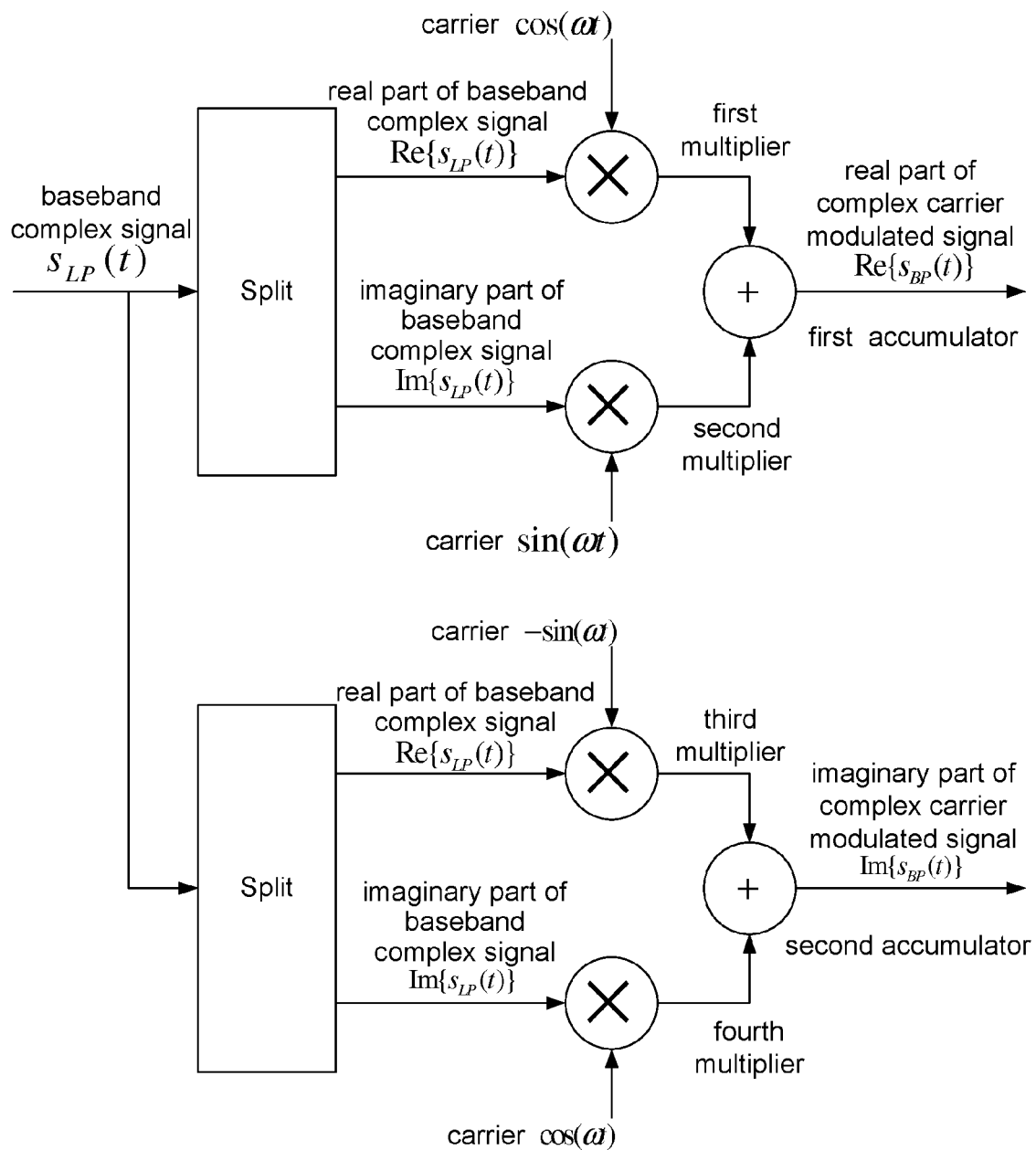
FIG. 9 shows a structural diagram of left rotating complex carrier modulation.
Figure 10:
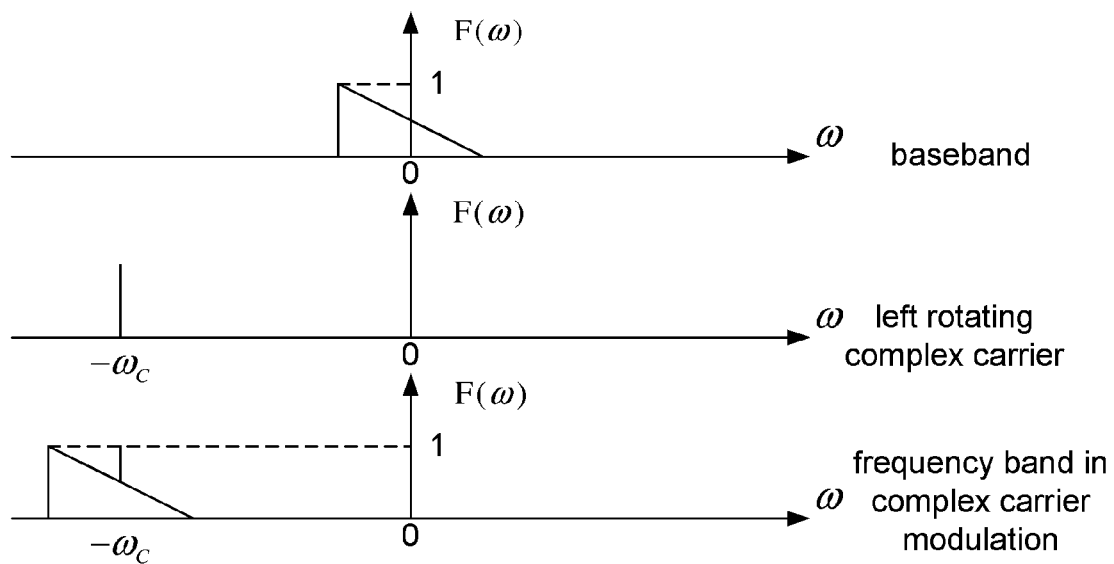
FIG. 10 shows a spectrum shifting process in left rotating complex carrier modulation.

Modulation is performed using a left rotating complex carrier signal according to the following formula: $s_{BP}(t)=s_{LP}(t)e^{-i\omega t}$, wherein $s_{BP}(t)$ represents a complex carrier modulated signal, $s_{LP}(t)$ represents a baseband complex signal, $e^{-i\omega t}$ represents a left rotating complex carrier signal. FIG. 8, FIG. 9 and FIG. 10 show a principle, a structure and a process of left rotating complex carrier modulation, respectively.

As shown in FIG. 8, the real part and the imaginary part of the left rotating complex carrier signal are both transmitted in a transmission medium, therefore what is transmitted in the medium is a left rotating complex signal.

As shown in FIG. 9, the left rotating complex carrier modulation process actually refers to modulating the real part signal and the imaginary part signal, respectively.

As shown in FIG. 10, since the left rotating complex signal is a determined left frequency signal, the left rotating complex carrier modulated signal occupies a left frequency band only, wherein the abscissa represents a frequency ω, the ordinate represents amplitude F(ω) and $\omega_C$ represents a complex carrier frequency.

Figure 11:
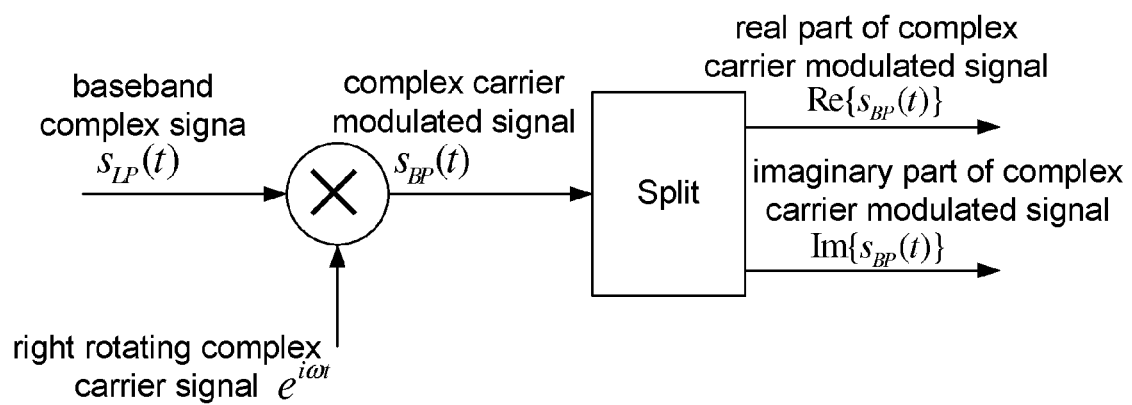
FIG. 11 shows a principle of right rotating complex carrier modulation.
Figure 12:
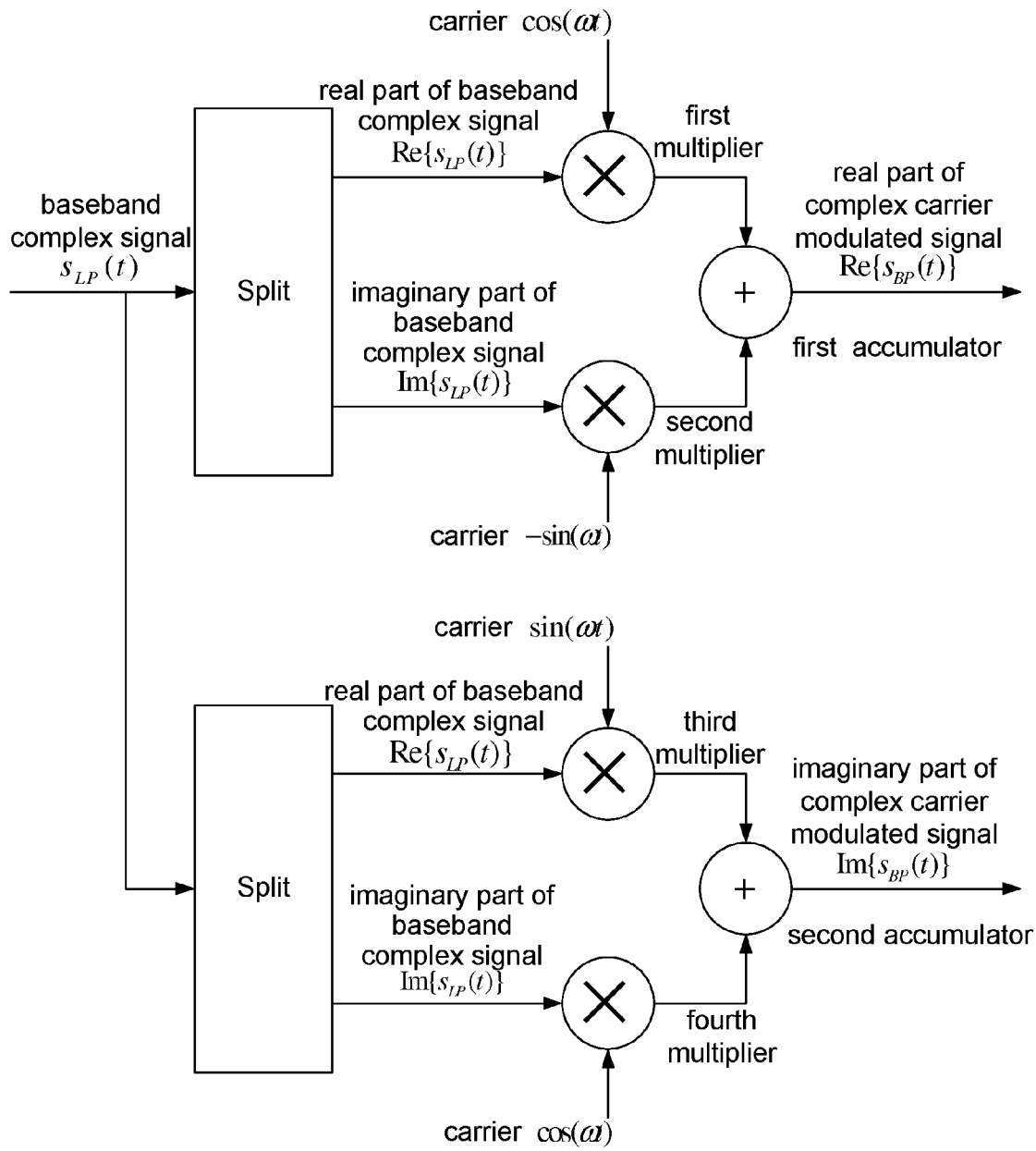
FIG. 12 shows a structural diagram of right rotating complex carrier modulation.
Figure 13:
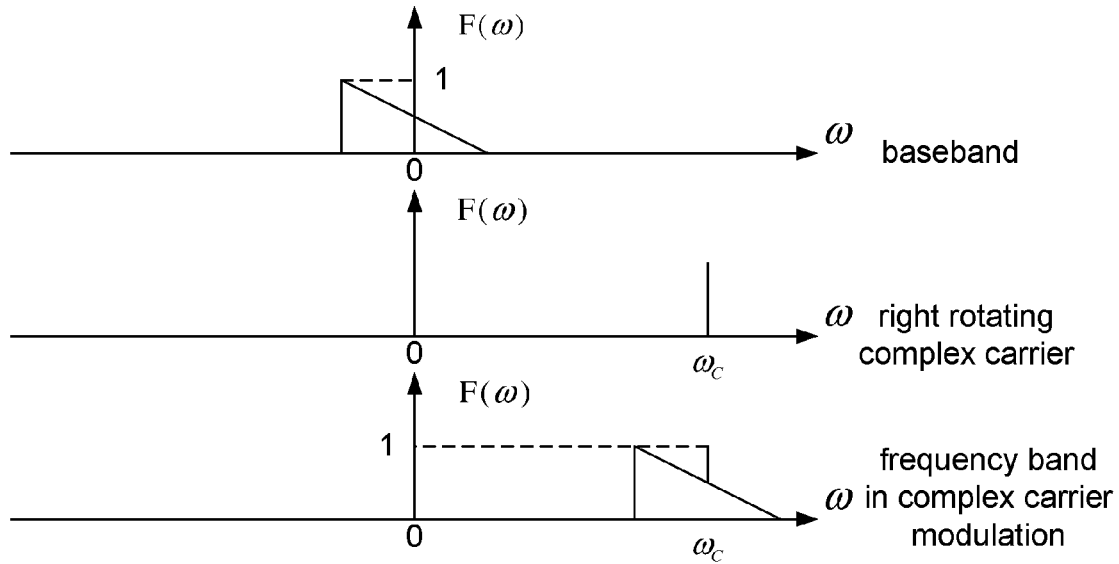
FIG. 13 shows a spectrum shifting process in right rotating complex carrier modulation.

Modulation is performed using a right rotating complex carrier signal according to the following formula: $s_{BP}(t)=s_{LP}(t)e^{i\omega t}$, wherein $s_{BP}(t)$ represents a complex carrier modulated signal, $s_{LP}(t)$ represents a baseband complex signal and $e^{i\omega t}$ represents a right rotating complex carrier signal. FIG. 11, FIG. 12 and FIG. 13 show a principle, a structure and a process of right rotating complex carrier modulation, respectively.

As shown in FIG. 11, the real part and the imaginary part of the right rotating complex carrier signal are both transmitted in a transmission medium, therefore what is transmitted in the medium is a right rotating complex signal.

As shown in FIG. 12, the right rotating complex carrier modulation process actually refers to modulating the real part signal and the imaginary part signal, respectively.

As shown in FIG. 13, since the right rotating complex signal is a determined right frequency signal, the right rotating complex carrier modulated signal occupies a right frequency band only, wherein the abscissa represents a frequency ω, the ordinate represents amplitude F(ω) and $\omega_C$ represents a complex carrier frequency.

Complex carrier modulation is a process for shifting a to-be-carried signal to a carrier frequency band. Similarly, complex carrier demodulation is a process for shifting a carried signal back from the frequency band. In essence, both the complex carrier modulation and the complex carrier demodulation refer to spectrum shifting, except that the spectrum shifting is performed in opposite directions. Therefore, a left rotating complex carrier modulated signal should be demodulated by a right rotating complex carrier signal. Similarly, a right rotating complex carrier modulated signal should be demodulated by a left rotating complex carrier signal.

Figure 14:
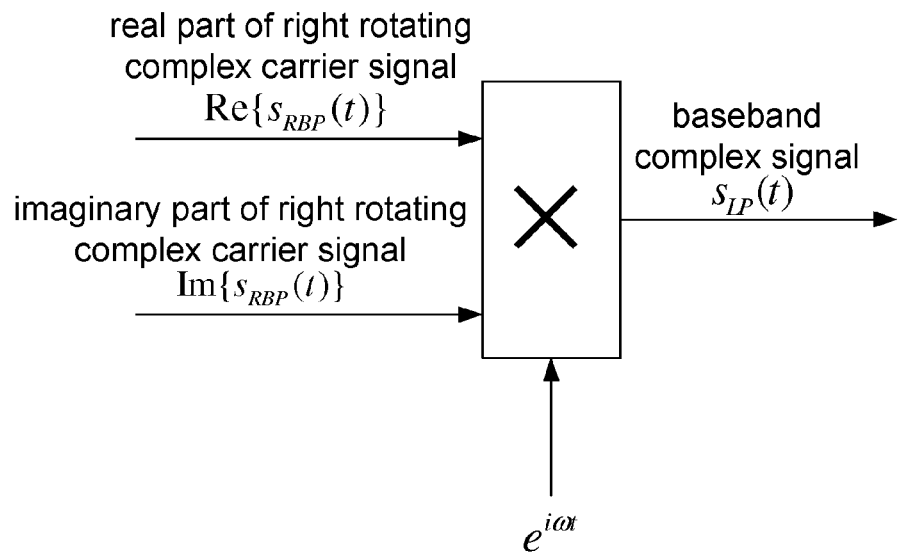
FIG. 14 shows a principle of right rotating complex carrier demodulation.
Figure 15:
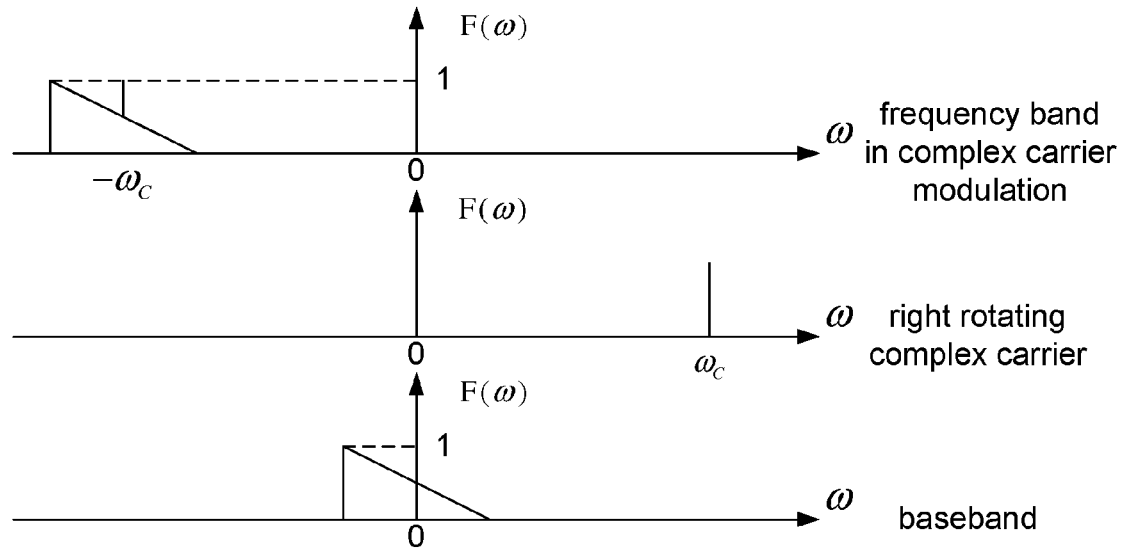
FIG. 15 shows a spectrum shifting process in right rotating complex carrier demodulation.

A left rotating complex carrier modulated signal is demodulated by a right rotating complex carrier signal according to the following formula: $s_{RLP}(t)=s_{BP}(t)e^{i\omega t}=(s_{LP}(t)e^{-i\omega t})e^{i\omega t}=s_{LP}(t)$, wherein $s_{RLP}(t)$ represents a received complex signal, $e^{i\omega t}$ represents a right rotating complex carrier signal, $s_{BP}(t)$ represents a complex carrier modulated signal, i.e. a modulated signal. A demodulation principle and process of a right complex carrier modulated signal are shown in FIG. 14 and FIG. 15.

Figure 16:
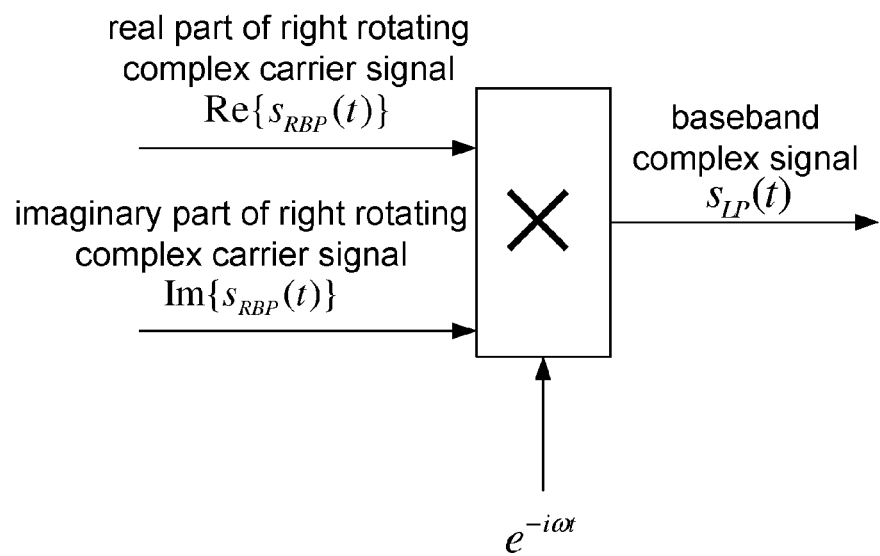
FIG. 16 shows a principle of left rotating complex carrier demodulation.
Figure 17:
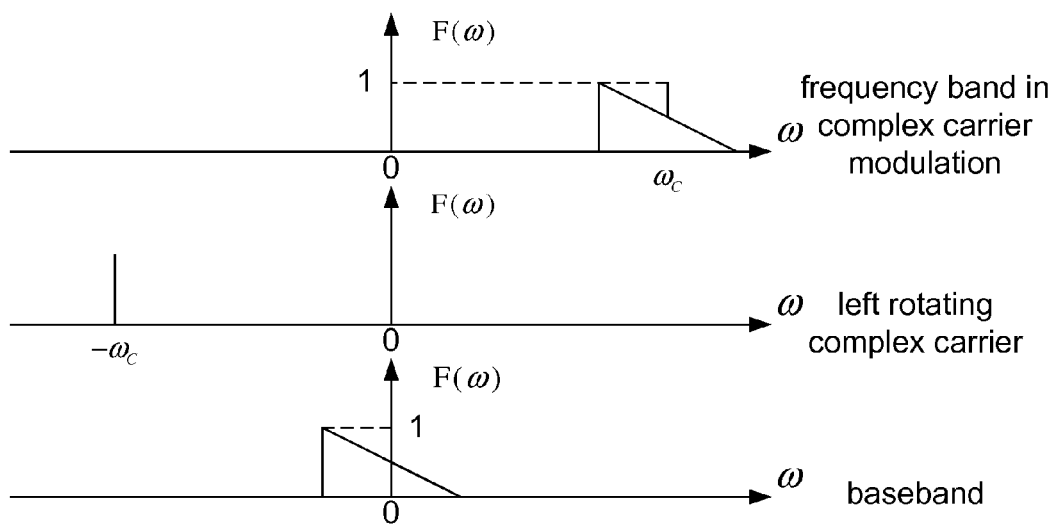
FIG. 17 shows a spectrum shifting process in left rotating complex carrier demodulation.

A right rotating complex carrier modulated signal is demodulated by a left rotating complex carrier signal according to the following formula: $s_{RLP}(t)=s_{BP}(t)e^{i\omega t}=(s_{LP}(t)e^{i\omega t})e^{-i\omega t}=s_{LP}(t)$, where $s_{RLP}(t)$ represents a received complex signal, $e^{-i\omega t}$ represents a left rotating complex carrier signal, $s_{BP}(t)$ represents a complex carrier modulated signal, i.e. a modulated signal. A demodulation principle and process of a left complex carrier modulated signal are shown in FIG. 16 and FIG. 17.

Figure 18:
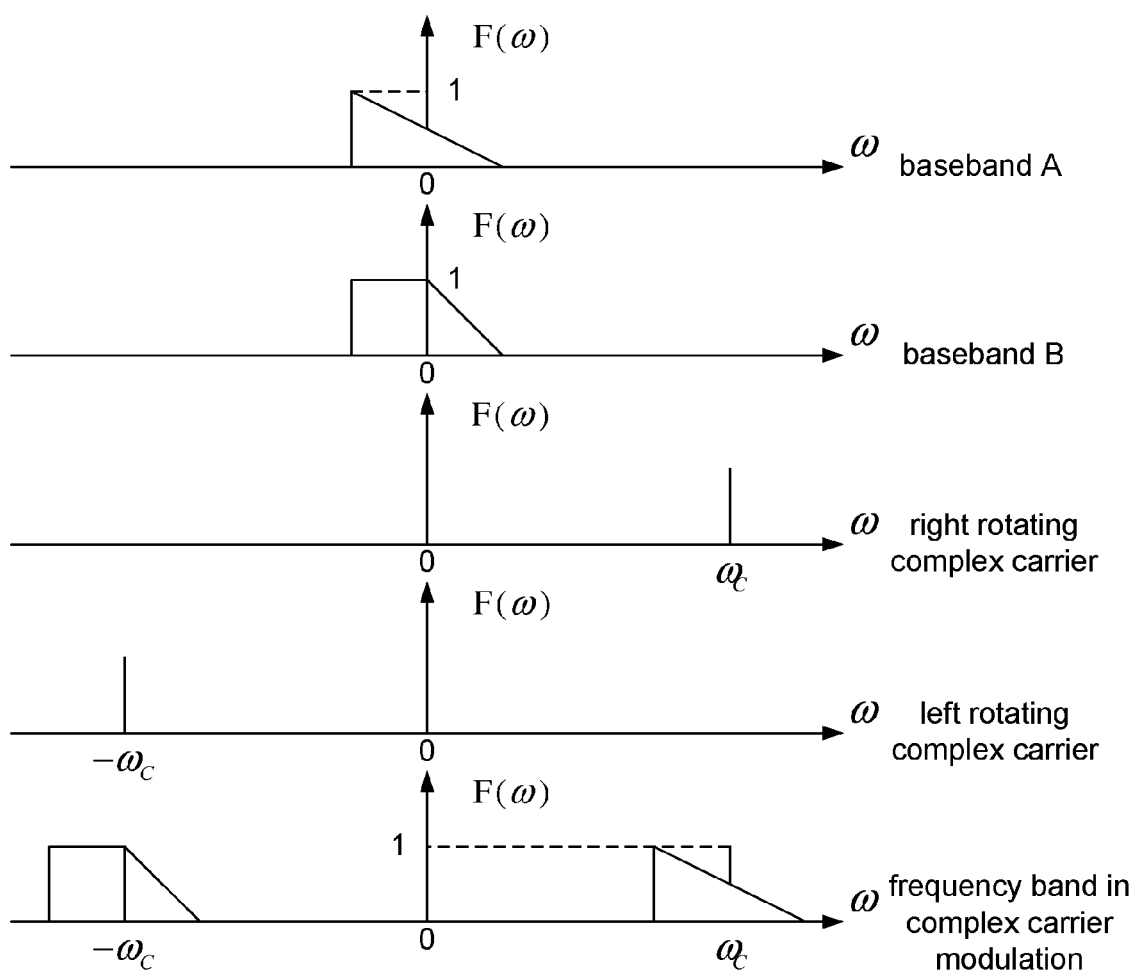
FIG. 18 shows a process of modulating different information by using left and right rotating complex carriers.
Figure 19:
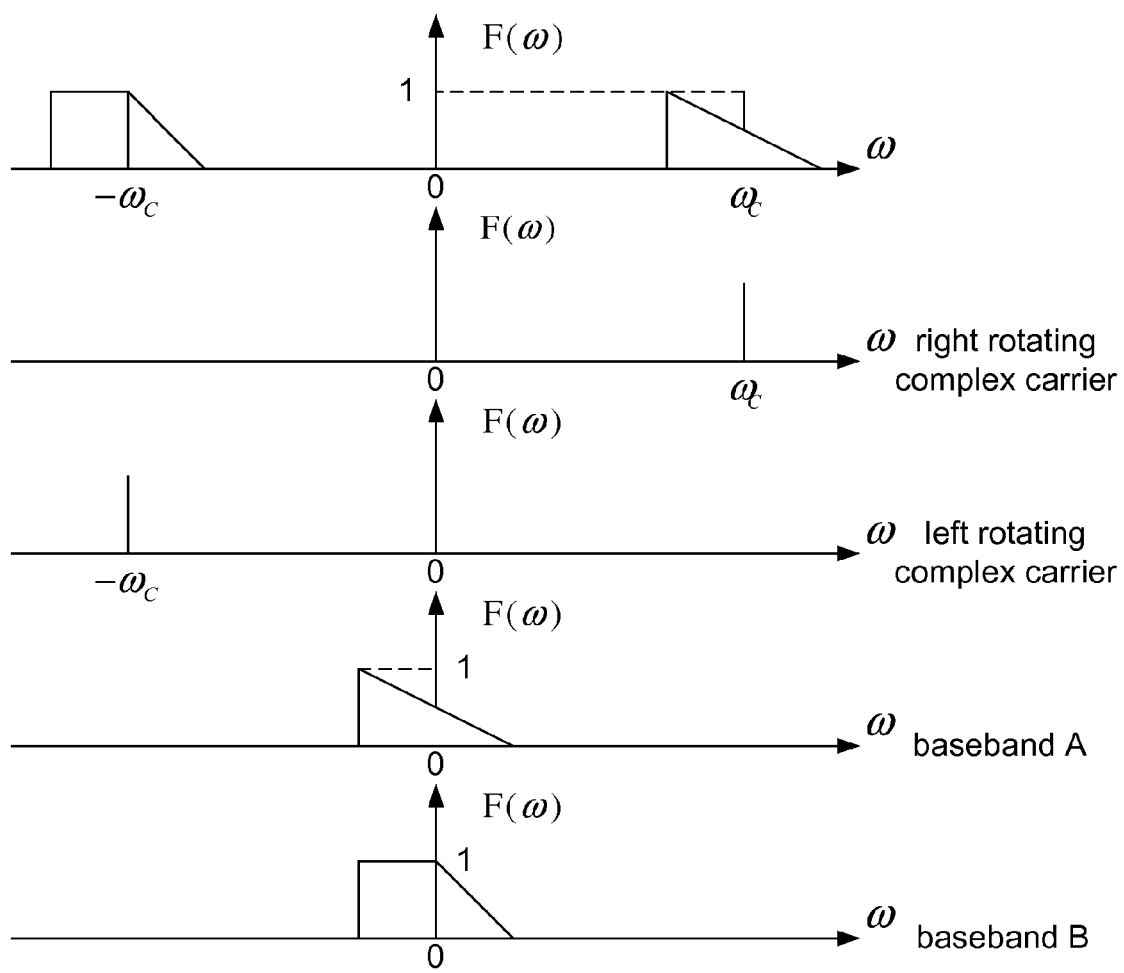
FIG. 19 shows a process of demodulating different information by using left and right rotating complex carriers.

Since the left and right rotating complex carrier signals are independent signals, they can carry different information independently. The process is as shown in FIG. 18, signals A and B to be carried may be carried to left and right frequency bands by using $\omega_C$ and $-\omega_C$ respectively. Similarly, the signals A and B to be carried can be demodulated respectively, which is shown in FIG. 19. Compared with the existing technologies, two types of independent to-be-carried signals can be transmitted when the same frequency band is occupied.

Figure 20:
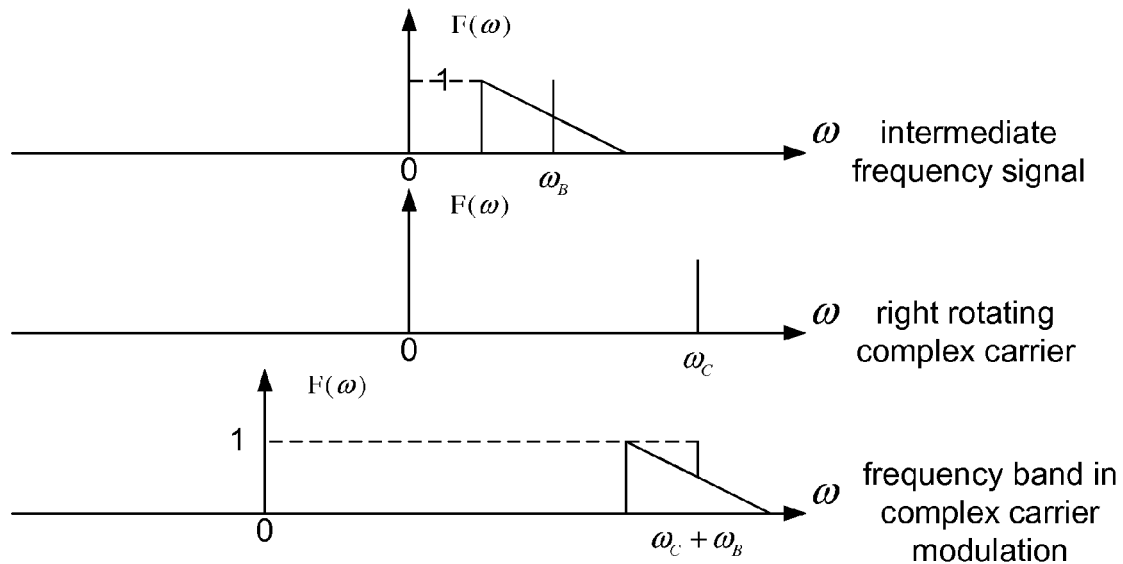
FIG. 20 shows a process of modulating intermediate frequency information by using a right rotating complex carrier.
Figure 21:
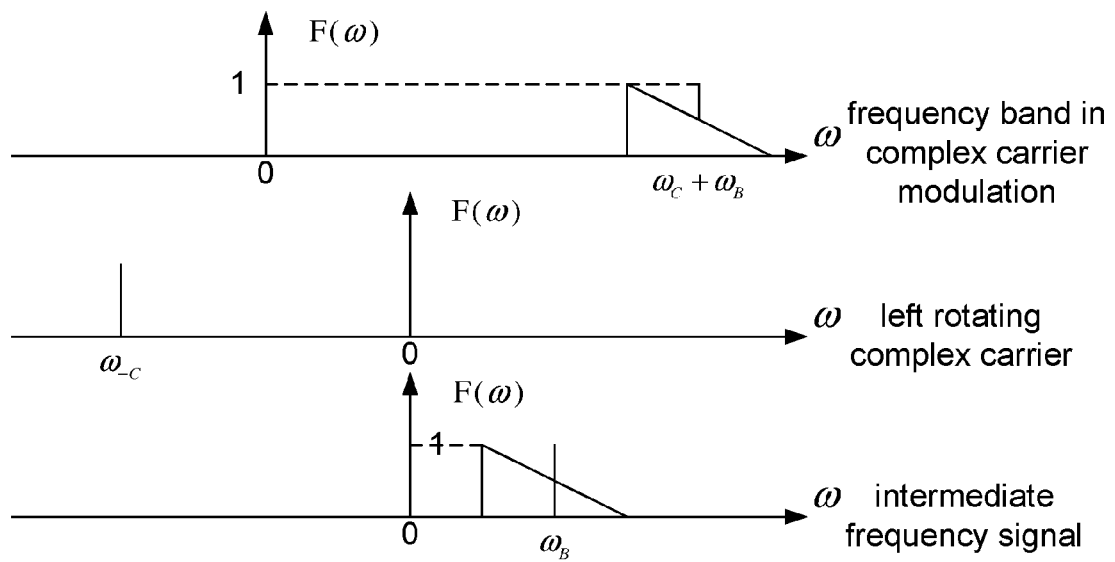
FIG. 21 shows a process of demodulating intermediate frequency information by using a left rotating complex carrier.

The essence of carrier modulation and demodulation is spectrum shifting, therefore the position of a to-be-carried signal in a spectrum is not restricted. The to-be-carried signal may be a baseband signal, or an intermediate frequency signal or even a modulated signal, a signal which has been modulated twice or a signal which has been modulated for N times. As shown in FIG. 20 and FIG. 21, the abscissas represent a frequency, the ordinates represent amplitude, $\omega_C$ is a complex carrier frequency and $\omega_B$ is a complex carrier frequency. A right rotating complex carrier is applied to modulation and a left rotating complex carrier is applied to demodulation in this embodiment. The process is a complex carrier modulation process of an intermediate frequency signal.

Figure 22:
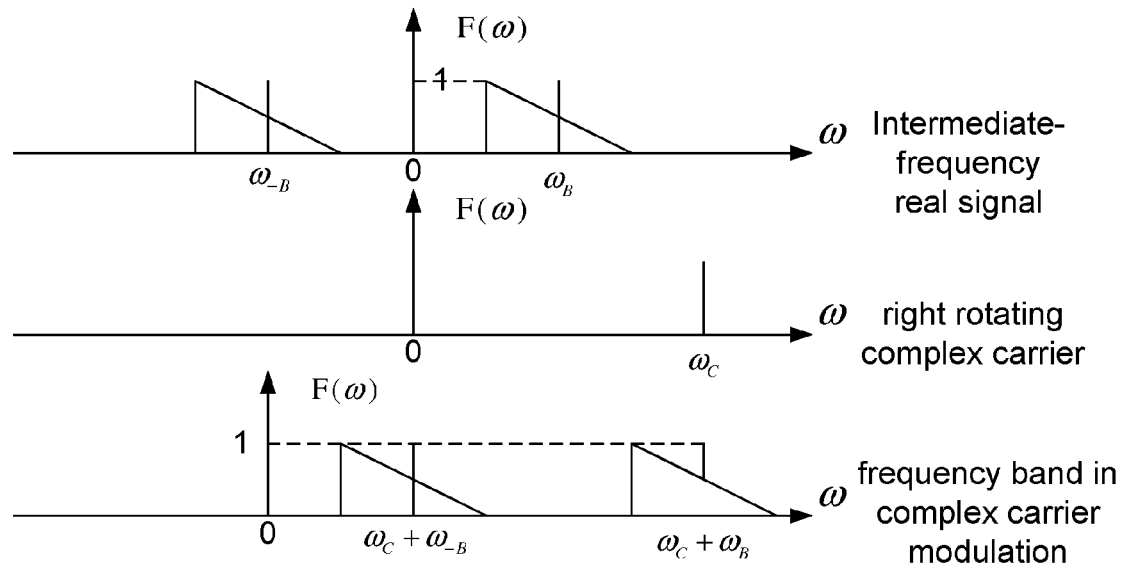
FIG. 22 shows a process of modulating an intermediate frequency real signal by using a right rotating complex carrier.

The essence of carrier modulation and demodulation is spectrum shifting, therefore the form of a to-be-carried signal is not restricted. The to-be-carried signal may be an analog signal, a digital signal, a complex signal, or a real signal. As shown in FIG. 22, the process in this embodiment is a complex carrier modulation process of an intermediate real signal. Here, a right rotating complex carrier is applied to modulation, wherein the abscissa represents a frequency, the ordinate represents amplitude, $\omega_C$ is a complex carrier frequency, $\omega_B$ is a carrier frequency and $\omega_{-B}$ is a carrier frequency.

Figure 23:
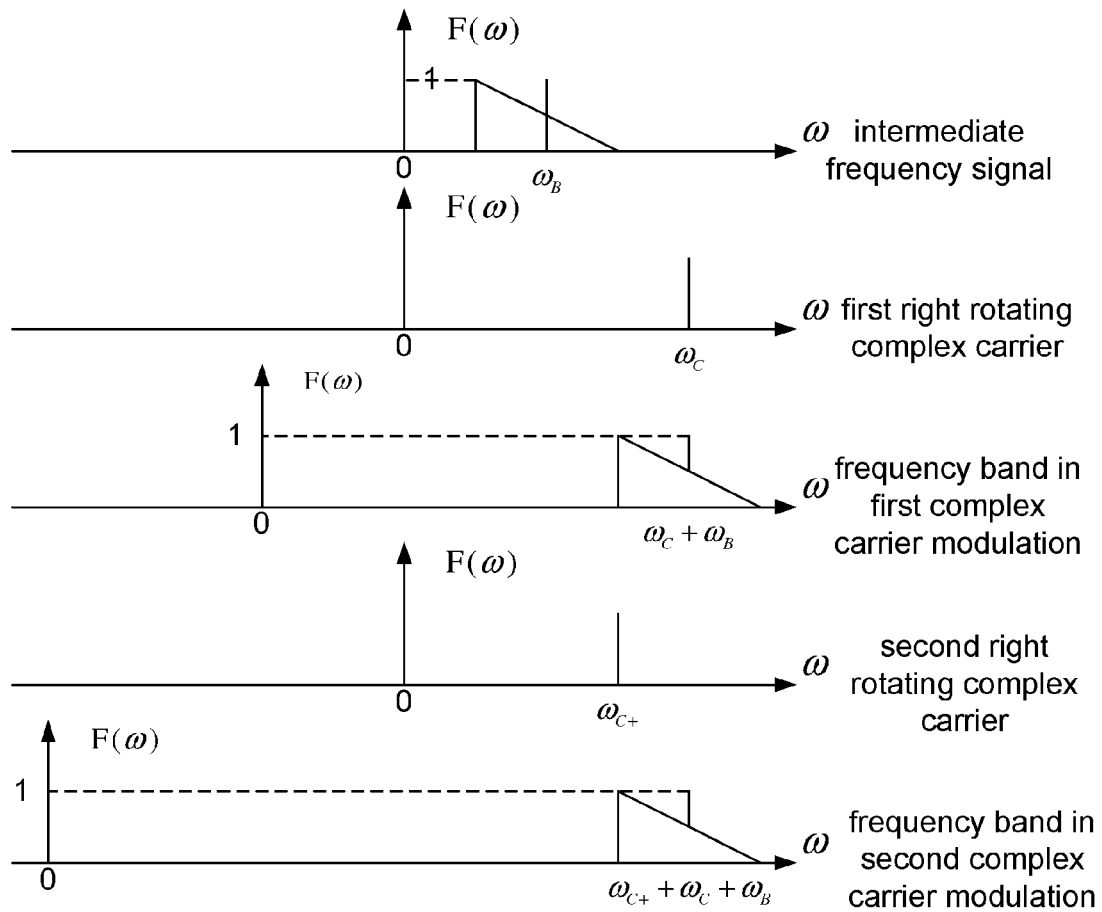
FIG. 23 shows second modulation using a right rotating complex carrier.

The essence of carrier modulation and demodulation is spectrum shifting, therefore it can be seen that the modulation and demodulation satisfy the "additivity" and the "interchangeability", i.e. complex carrier modulation and demodulation processes may be performed for unlimited times. In other words, the modulation can be performed once, twice . . . , for N times, which is equivalent to an accumulation and modulation. At the same time, the modulation sequence can also be exchanged without influencing an accumulation result according to the following formula: $\omega_C=\omega_{C1}+\omega_{C2}+\omega_{C3}+\ldots+\omega_{CN}$. As shown in FIG. 23 which shows a second modulation, wherein the abscissa represents a frequency, the ordinate represents amplitude, $\omega_B$ represents a carrier frequency, $\omega_C$ is a first complex carrier frequency and $\omega_{C+}$ is a second complex carrier frequency.

The disclosure provides a device for complex carrier modulation, which is configured to use a complex signal as a carrier signal to modulate a to-be-carried signal to obtain a complex carrier modulated signal. The complex carrier signal is $e^{-i\omega t}$ or $e^{i\omega t}$.

The device for complex carrier modulation of the disclosure specifically includes a complex carrier modulated signal real part modulation unit and a complex carrier modulated signal imaginary part modulation unit.

FIG. 9 shows the first embodiment of the device for complex carrier modulation, which applies left rotating complex carrier signal modulation: the real part modulation unit includes a first multiplier, a second multiplier and a first accumulator. The first multiplier is configured to multiply the real part of a to-be-carried signal with $\cos(\omega t)$, the second multiplier is configured to multiply the imaginary part of the to-be-carried signal with $\sin(\omega t)$, and accumulation is performed in the first accumulator to obtain the real part of a complex carrier modulated signal. The imaginary part modulation unit includes a third multiplier, a fourth multiplier and a second accumulator; the third multiplier is configured to multiply the real part of the to-be-carried signal with $-\sin(\omega t)$, the fourth multiplier is configured to multiply the imaginary part of the to-be-carried signal with $\cos(\omega t)$ and accumulation is performed in the second accumulator, so as to obtain a complete complex carrier modulated signal, FIG. 12 shows the second embodiment of the device for complex carrier modulation, which applies right rotating complex carrier signal modulation: the real part modulation unit includes a first multiplier, a second multiplier and a first accumulator. The first multiplier is configured to multiply the real part of a to-be-carried signal with $\cos(\omega t)$, the second multiplier is configured to multiply the imaginary part of the to-be-carried signal with $-\sin(\omega t)$ and accumulation is performed in the first accumulator. The imaginary part modulation unit includes a third multiplier, a fourth multiplier and a second accumulator; the third multiplier is configured to multiply the real part of the to-be-carried signal with $\sin(\omega t)$, the fourth multiplier is configured to multiply the imaginary part of the to-be-carried signal with $\cos(\omega t)$ and accumulation is performed in the second accumulator, so as to obtain a complete complex carrier modulated signal.

The disclosure further provides a device for complex carrier demodulation, which is configured to use a complex signal as a carrier signal to demodulate a modulated signal to obtain a complex carrier demodulated signal. The complex carrier signal is $e^{-i\omega t}$ or $e^{i\omega t}$, and the device specifically includes: a complex carrier demodulated signal real part demodulation unit and a complex carrier demodulated signal imaginary part demodulation unit.

Embodiment 1: when a modulation end applies left rotating complex carrier modulation, the demodulation device applies right rotating complex carrier demodulation. The real part demodulation unit includes a first multiplier, a second multiplier and a first accumulator. The first multiplier is configured to multiply the real part of a to-be-carried signal with $\cos(\omega t)$, the second multiplier is configured to multiply the imaginary part of the to-be-carried signal with $-\sin(\omega t)$ and accumulation is performed in the first accumulator. The imaginary part demodulation unit includes a third multiplier, a fourth multiplier and a second accumulator; the third multiplier is configured to multiply the real part of the to-be-carried signal with $\sin(\omega t)$, the fourth multiplier is configured to multiply the imaginary part of the to-be-carried signal with $\cos(\omega t)$ and accumulation is performed in the second accumulator. The specific schematic diagram is similar to FIG. 9, therefore this figure will not be repeated here.

Embodiment 2: when a modulation end applies right rotating complex carrier modulation, the demodulation device applies left rotating complex carrier demodulation. The real part demodulation unit includes a first multiplier, a second multiplier and a first accumulator. The first multiplier is configured to multiply the real part of a to-be-carried signal with $\cos(\omega t)$, the second multiplier is configured to multiply The imaginary part of the to-be-carried signal with $\sin(\omega t)$ and accumulation is performed in the first accumulator. The imaginary part demodulation unit includes a third multiplier, a fourth multiplier and a second accumulator: the third multiplier is configured to multiply the real part of the to-be-carried signal with $-\sin(\omega t)$, the fourth multiplier is configured to multiply the imaginary part of the to-be-carried signal with $\cos(\omega t)$ and accumulation is performed in the second accumulator. The specific schematic diagram is similar to FIG. 12, therefore, this figure will not be repeated here.

The disclosure further provides a system for complex carrier modulation/demodulation. When, at a modulation end, the system is a device for complex carrier modulation, the system may be a device for complex carrier or real carrier modulation at a demodulation end; when the system is a device for real carrier modulation at the modulation end, the system may be a device for complex carrier or real carrier modulation at the demodulation end.

Embodiment 1: a system for complex carrier modulation/demodulation includes a device for complex carrier modulation and a device for complex carrier demodulation, wherein the device for complex carrier modulation is configured to use a complex signal as a carrier signal to modulate a to-be-carried signal to obtain a complex carrier modulated signal. The complex carrier signal is $e^{-i\omega t}$ or $e^{i\omega t}$;

the device for complex carrier demodulation is configured to use a complex signal as a carrier signal to demodulate a modulated signal to obtain a complex carrier demodulated signal. The complex carrier signal is $e^{-i\omega t}$ or $e^{i\omega t}$.

Embodiment 2: a system for complex carrier modulation/demodulation includes a device for complex carrier modulation and a device for real carrier demodulation, wherein the device for complex carrier modulation is configured to use a complex signal as a carrier signal to modulate a to-be-carried signal to obtain a complex carrier modulated signal. The complex carrier signal is $e^{-i\omega t}$ or $e^{i\omega t}$;

Embodiment 3: a system for complex carrier modulation/demodulation includes a device for real carrier modulation and a device for complex carrier demodulation, wherein the device for complex carrier demodulation is configured to use a complex signal as a carrier signal to demodulate a modulated signal to obtain a complex carrier demodulated signal. The complex carrier signal is $e^{-i\omega t}$ or $e^{i\omega t}$;

The disclosure further provides a device for transmitting a complex carrier modulated signal, which is configured to transmit a complex carrier modulated signal modulated and obtained according to the method for complex carrier modulation above.

Embodiment 1: a device for transmitting a complex carrier modulated signal includes: a real part signal transmission unit and an imaginary part signal transmission unit, wherein the real part signal transmission unit is configured to transmit a real part signal in a complex carrier modulated signal, the imaginary part signal transmission unit is configured to transmit an imaginary part signal in the complex carrier modulated signal, and the real part signal and the imaginary part signal are spatially vertical.

Figure 24:
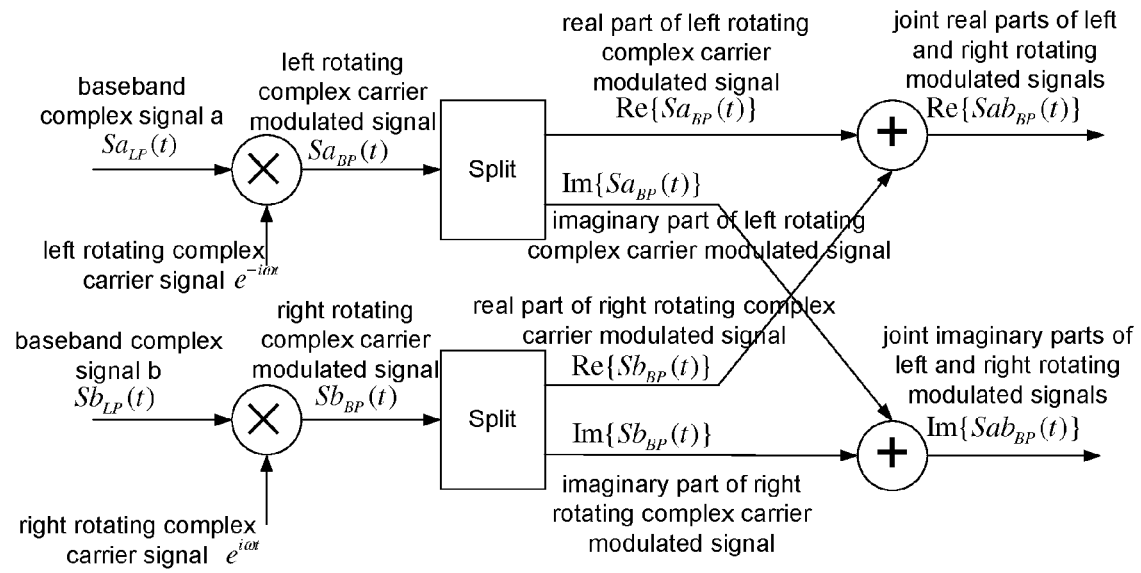
FIG. 24 shows joint transmission of left and right rotating complex carrier modulated signals.

Preferably, the real part signal transmission unit and the imaginary part signal transmission unit are linearly polarized antennae vertical to each other in a space; or the real part signal transmission unit and the imaginary part signal transmission unit form a circularly polarized antenna, wherein the left and right rotating complex carrier modulated signals can be transmitted separately or jointly, as shown in FIG. 24.

The disclosure further provides a device for receiving a complex carrier modulated signal, configured to receive a complex carrier modulated signal modulated, obtained, and transmitted according to the method for complex carrier modulation above.

Embodiment 1: a device for receiving a complex carrier modulated signal includes: a real part signal receiving unit and an imaginary part signal receiving unit. The real part signal receiving unit is configured to receive a real part signal in a complex carrier modulated signal, the imaginary part signal receiving unit is configured to receive an imaginary part signal in the complex carrier modulated signal, and the real part signal and the imaginary part signal are spatially vertical.

Preferably, the real part signal receiving unit and the imaginary part signal receiving unit are linearly polarized antennae vertical to each other in a space; or the real part signal receiving unit and the imaginary part signal receiving unit form a circularly polarized antenna.

Figure 1:
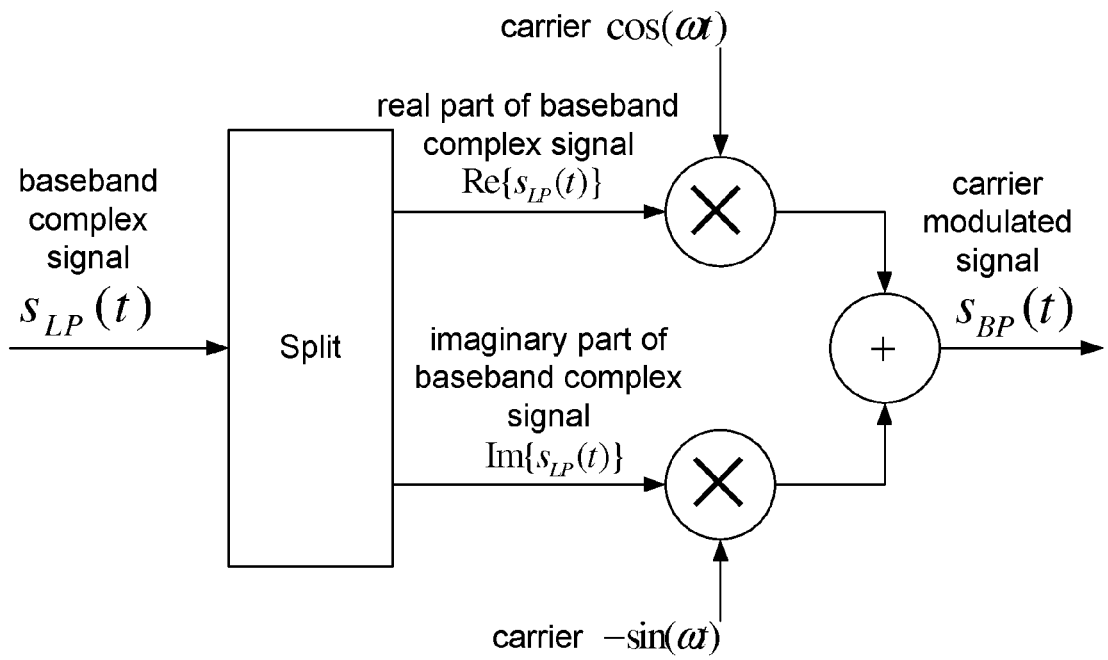
FIG. 1 shows a modulation principle in an existing technology.
Figure 2:
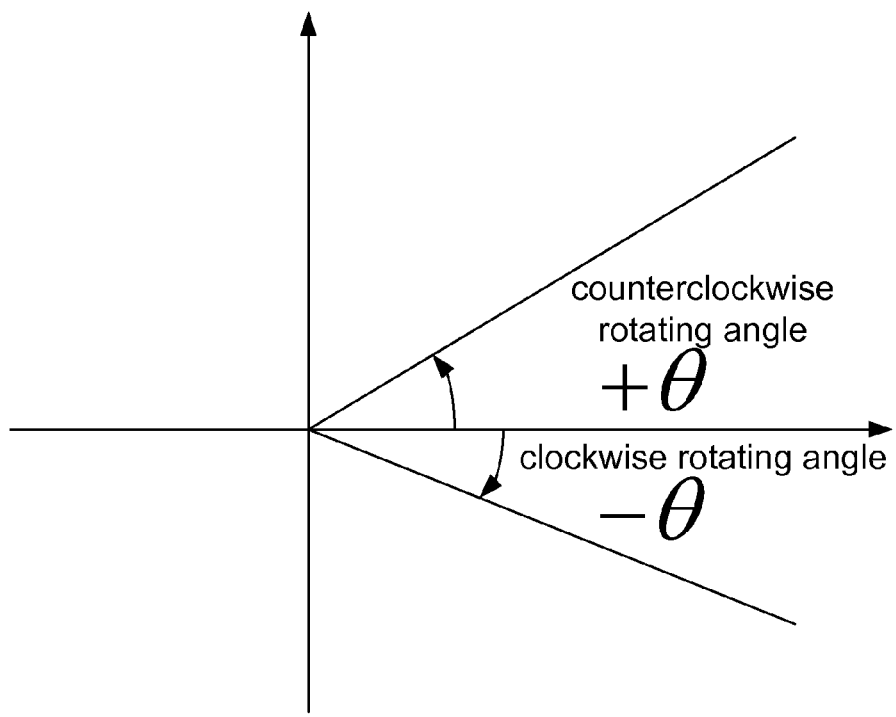
FIG. 2 shows definitions of angles in a complex plane.
Figure 4:
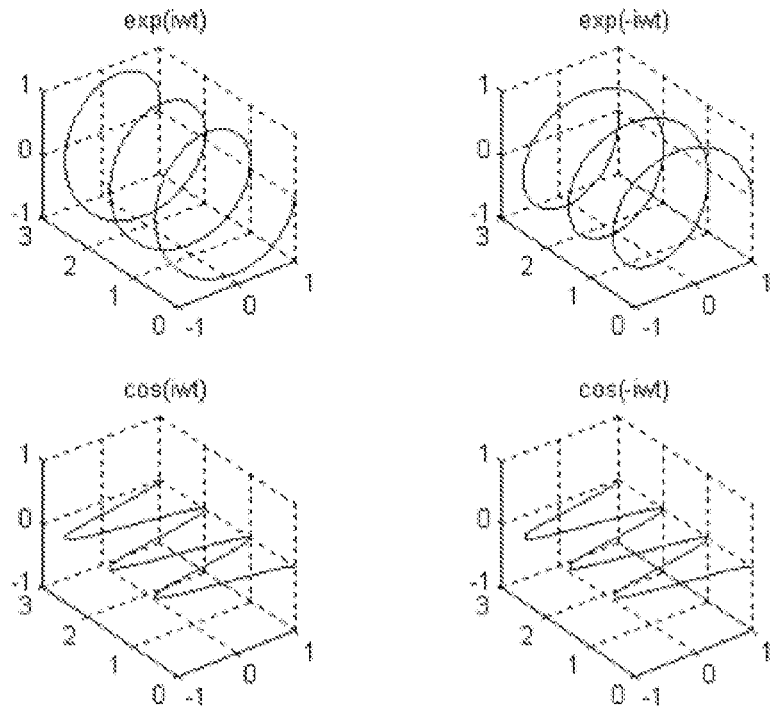
FIG. 4 shows two types of rotation $e^{-i\omega t}$ and $e^{i\omega t}$ in a space.
Figure 5:
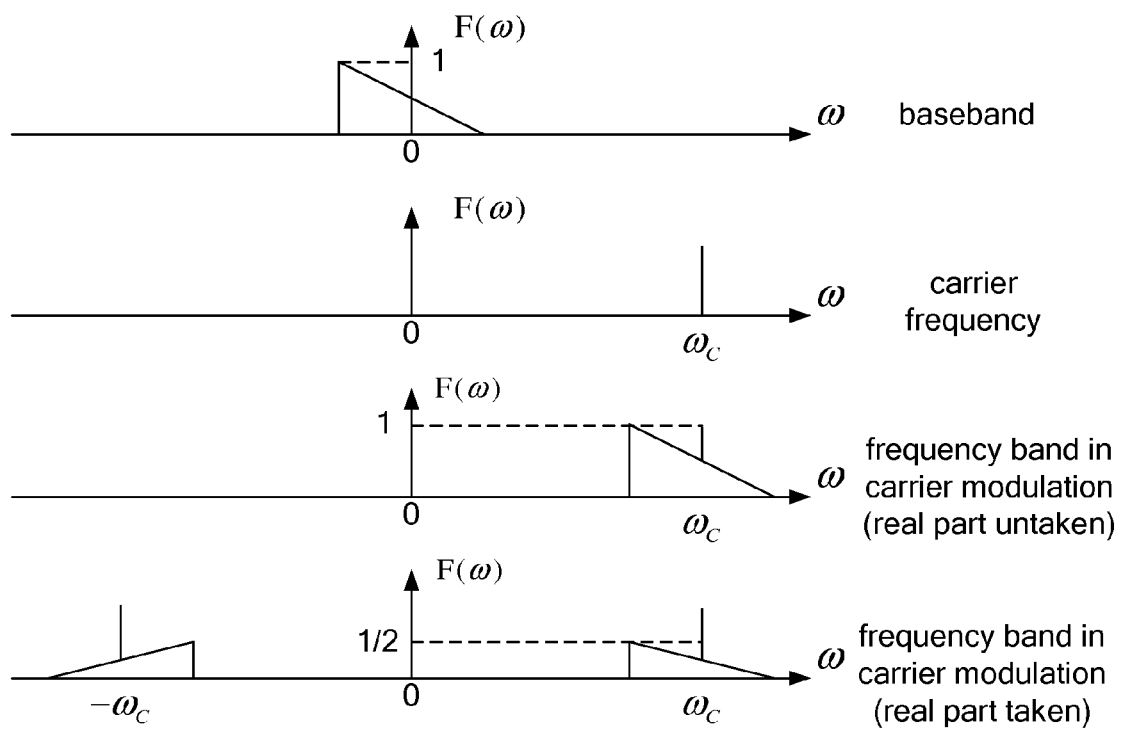
FIG. 5 shows a spectrum shifting process in real carrier modulation.
Figure 6:
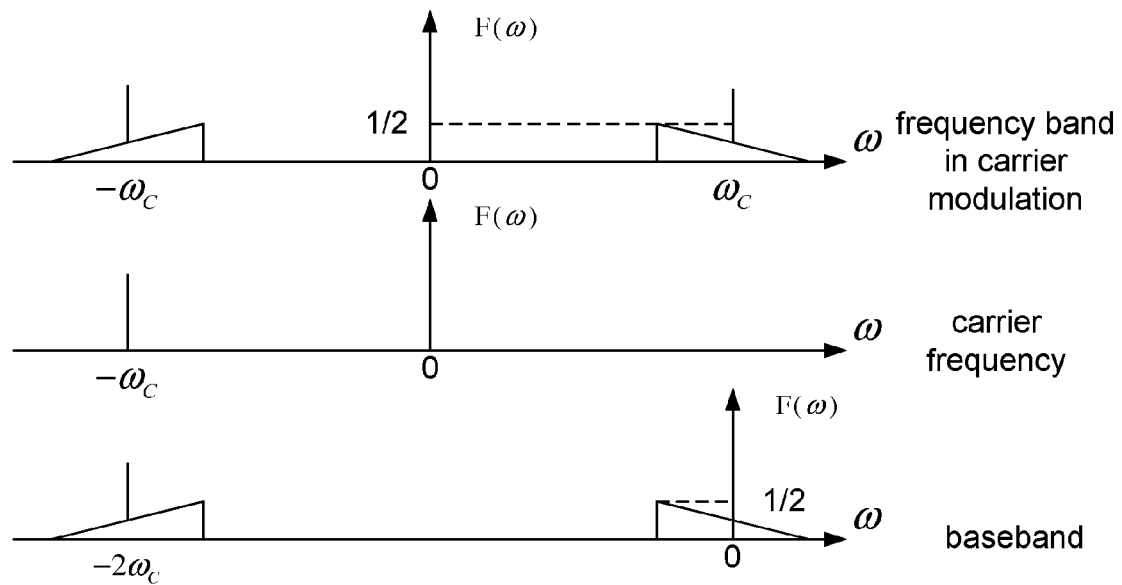
FIG. 6 shows a spectrum shifting process in real carrier demodulation
Figure 7:
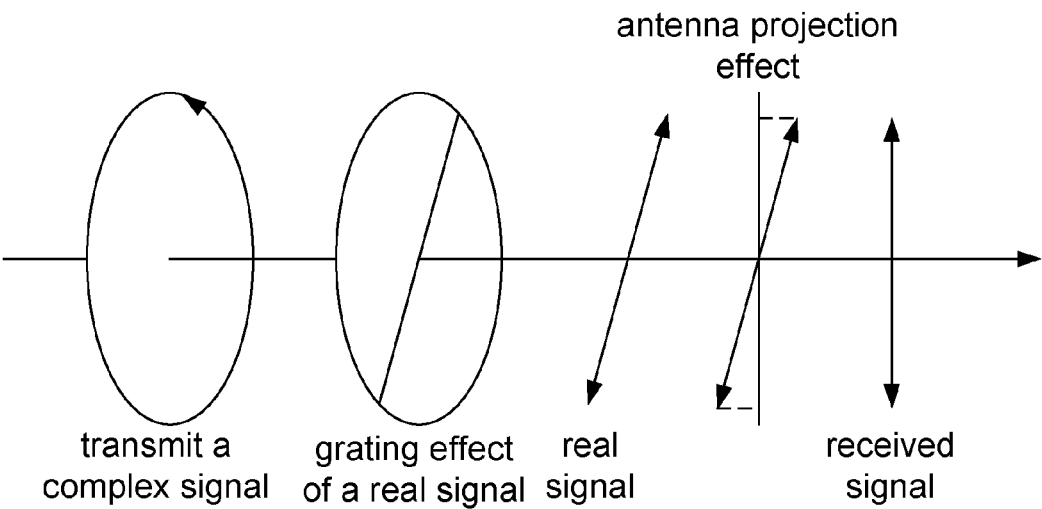
FIG. 7 shows a schematic diagram illustrating the loss of real carrier signal energy.
Figure 25:
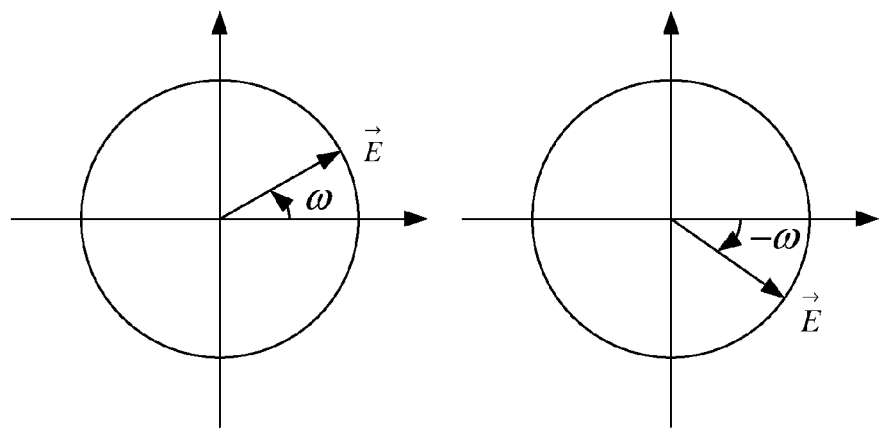
FIG. 25 shows electromagnetic waves in two rotation directions.

A rotating complex signal in a transmission medium is as shown in FIG. 4. It can be seen from Euler's formula: $e^{\pm i\omega t} = \cos(\omega t) \pm i \sin(\omega t)$ and FIG. 4 that the physical meaning of i is to be spatially vertical. Therefore, as long as a real part signal and an imaginary part signal which are spatially vertical to each other can be transmitted in a transmission medium, a rotating complex signal can be formed naturally according to the principle of vector addition of signals in electric fields. The rotating complex signal is a rotating electromagnetic signal. The electromagnetic signal in two rotation directions as shown in FIG. 25 is corresponding to left and right rotating complex carrier modulated signals, respectively, wherein the abscissa represents a frequency, the ordinate represents amplitude, $\omega$ represents a positive angular frequency, $-\omega$ represents a negative angular frequency and $\vec{E}$ represents an electromagnetic vector.

To sum up, by applying the methods for complex carrier modulation and demodulation, the right and left frequency spectrum resources are used adequately and double frequency spectrum resources can be obtained in the current defined bandwidths, therefore the spectrums are utilized more efficiently compared with real carrier modulation. At the same time, what is transmitted in a medium is a rotating complex signal in complex carrier modulation, therefore, the energy loss is smaller compared with real carrier modulation. Since complex carrier modulation can use the right and left frequency spectrum resources adequately, the complex carrier modulation will certainly become the mainstream of the communication of the next generation.

The above are only preferred embodiments of the disclosure and are used to limit the disclosure. For those skilled in the art, the disclosure may have various modifications and changes. Any modifications, equivalent replacements, improvements or the like within the spirit and principle of the disclosure shall fall within the scope of protection of the disclosure.

The invention claimed is:

1. A method for complex carrier modulation, comprising:
   receiving, by modulators including multipliers and adders in a base station or a terminal, a to-be-carried signal;
   modulating, by the modulators the to-be-carried signal using a complex signal as a carrier signal to obtain a complex carrier modulated signal, wherein the complex carrier signal is generated by a circuit in the base station or the terminal and sent to the modulators;
   wherein the complex carrier signal is a left rotating carrier signal $e^{-i\omega t}$ or a right rotating carrier signal $e^{i\omega t}$; and $e^{-i\omega t}$ and $e^{i\omega t}$ are distinguishable frequencies;
   wherein $e^{-i\omega_1 t}$ is adapted to modulate a first to-be-carried signal, and $e^{i\omega_2 t}$ is adapted to modulate a second to-be-carried signal, wherein $\omega_1 = \omega_2$; and the first to-be-carried signal and the second to-be-carried signal are independent information.

2. The method according to claim 1, wherein the complex carrier modulated signal is a complex signal, which comprises a real part signal and an imaginary part signal.

3. The method according to claim 2, wherein the real part signal and the imaginary part signal of the complex carrier modulated signal are maintained to be transmitted vertically in a space of a transmission medium.

4. The method according to claim 1, wherein in the step of using a complex signal as a carrier signal to modulate a to-be-carried signal, a following formula is adopted: $s_{BP}(t) = s_{LP}(t) e^{-i\omega t}$,
   wherein the $s_{BP}(t)$ represents the complex carrier modulated signal, the $s_{LP}(t)$ represents the to-be-carried signal, the $e^{-i\omega t}$ represents the left rotating complex carrier signal, and a range of a value of the frequency $-\omega$ is from 0 to $-\infty$.

5. The method according to claim 4, wherein a rotation direction of the left rotating complex carrier signal accords with a left-hand rule.

6. The method according to claim 1, wherein in the step of using a complex signal as a carrier signal to modulate a to-be-carried signal, a following formula is adopted: $s_{BP}(t) = s_{LP}(t) e^{i\omega t}$,
   wherein the $s_{BP}(t)$ represents the complex carrier modulated signal, the $s_{LP}(t)$ represents the to-be-carried signal, the $e^{i\omega t}$ represents the right rotating complex carrier signal, and a range of a value of the frequency $+\omega$ is from 0 to $+\infty$.

7. The method according to claim 6, wherein a rotation direction of the right rotating complex carrier signal accords with a right-hand rule.

8. The method according to claim 1, wherein the to-be-carried signal is an analog signal, or a discrete digital signal, or stored data; the to-be-carried signal is a real signal, or a complex signal; the to-be-carried signal is an original signal, or a baseband signal, or an intermediate frequency signal, or a modulated signal, or a signal which has been modulated for N times; and the complex carrier signal is an analog signal, or a discrete digital signal, or stored data.

9. The method according to claim 1, wherein when the frequency of the complex carrier signal has a frequency as follows: $\omega_c = \omega_{c1} + \omega_{c2} + \omega_{c3} + \ldots + \omega_{CN}$, it can be modulated by a complex signal with a frequency of $\omega_C$, or modulated for a plurality of times by complex signals with frequencies of $\omega_{c1}$, $\omega_{c2}, \omega_{c3} \ldots \omega_{CN}$, wherein modulation sequences can be exchanged.

10. The method according to claim 2, wherein the complex carrier modulated signal is a rotating electromagnetic signal transmitted in a wire, wireless or optical fiber transmission medium.

11. A device for complex carrier modulation in a base station or a terminal, comprising: modulators including multipliers and adders, the modulators receive a to-be-carried signal and modulate the to-be-carried signal using a complex signal as a carrier signal to obtain a complex carrier modulated signal, wherein the complex carrier signal is generated by a circuit in the base station or the terminal and sent to the modulators;

wherein the complex carrier signal is $e^{-i\omega t}$ or $e^{i\omega t}$, and wherein $e^{-i\omega t}$ and $e^{i\omega t}$ are distinguishable frequencies;

$e^{-i\omega_1 t}$ is adapted to modulate a first to-be-carried signal; and $e^{i\omega_2 t}$ is adapted to modulate a second to-be-carried signal, $\omega_2=\omega_2$, and the first to-be-carried signal and the second to-be-carried signal are independent information.

12. The device according to claim 11, comprising a complex carrier modulated signal real part modulation unit and a complex carrier modulated signal imaginary part modulation unit.

13. The device according to claim 12, wherein the real part modulation unit comprises a first multiplier, a second multiplier and a first accumulator; wherein the first multiplier is configured to multiply a real part of the to-be-carried signal with $\cos(\omega t)$. the second multiplier is configured to multiply an imaginary part of the to-be-carried signal with $-\sin(\omega t)$; and the first accumulator is configured to perform accumulation;

and the imaginary part modulation unit comprises a third multiplier, a fourth multiplier and a second accumulator; wherein the third multiplier is configured to multiply the real part of the to-be-carried signal with $\sin(\omega t)$; the fourth multiplier is configured to multiply the imaginary part of the to-be-carried signal with $\cos(\omega t)$; and the second accumulator is configured to perform accumulation.

14. The device according to claim 11, wherein the real part modulation unit comprises a first multiplier, a second multiplier and a first accumulator; wherein the first multiplier is configured to multiply the real part of the to-be-carried signal with $\cos(\omega t)$ the second multiplier is configured to multiply the imaginary part of the to-be-carried signal with $\sin(\omega t)$; and the first accumulator is configured to perform accumulation;

and the imaginary part modulation unit comprises a third multiplier, a fourth multiplier and a second accumulator; wherein the third multiplier is configured to multiply the real part of the to-be-carried signal with $-\sin(\omega t)$; the fourth multiplier is configured to multiply the imaginary part of the to-be-carried signal with $\cos(\omega t)$; and the second accumulator is configured to perform accumulation.

15. A system for complex carrier modulation/demodulation, comprising a complex carrier modulation device and a complex carrier demodulation device, the complex carrier modulation device and the complex carrier demodulation device are located in a base station and a terminal, respectively;

wherein the complex carrier modulation device comprises: modulators including multipliers and adders, the modulators receive a to-be-carried signal and modulate the to-be-carried signal using a complex signal as a carrier signal to obtain a complex carrier modulated signal, wherein the complex carrier signal is generated by a circuit in the base station or the terminal and sent to the modulators;

wherein the complex carrier signal is $e^{-i\omega t}$ or $e^{i\omega t}$, and wherein $e^{-i\omega t}$ and $e^{i\omega t}$ are distinguishable frequencies;

$e^{-i\omega_1 t}$ is adapted to modulate a first to-be-carried signal; and $e^{i\omega_2 t}$ is adapted to modulate a second to-be-carried signal, $\omega_1=\omega_2$, and the first to-be-carried signal and the second to-be-carried signal are independent information;

and the complex carrier demodulation device is configured to use a complex signal as a carrier signal to demodulate a modulated signal to obtain a complex carrier demodulated signal based on carrier frequency signals, multipliers and adders; and the complex carrier signal is $e^{-i\omega t}$ or $e^{i\omega t}$.

16. The system according to claim 15, wherein the system is a digital or an analog communication system, or a broadcasting system, or a remote-sensing, telemetering and remote-control system.

17. A system for complex carrier modulation/demodulation, comprising a complex carrier modulation device and a real carrier demodulation device, the complex carrier modulation device and the real carrier demodulation device are located in a base station and a terminal, respectively;

wherein the complex carrier modulation device comprises: modulators including multipliers and adders, the modulators receive a to-be-carried signal and modulate the to-be-carried signal using a complex signal as a carrier signal to obtain a complex carrier modulated signal, wherein the complex carrier signal is generated by a circuit in the base station or the terminal and sent to the modulators;

wherein the complex carrier signal is $e^{-i\omega t}$ or $e^{i\omega t}$ and wherein $e^{-i\omega t}$ and $e^{i\omega t}$ are distinguishable frequencies;

$e^{-i\omega_1 t}$ is adapted to modulate a first to-be-carried signal; and $e^{i\omega_2 t}$ is adapted to modulate a second to-be-carried signal, $\omega_1=\omega_2$, and the first to-be-carried signal and the second to-be-carried signal are independent information.

18. A system for complex carrier modulation/demodulation, comprising a real carrier modulation device and a complex carrier demodulation device, the real carrier modulation device and the complex carrier demodulation device are located in a base station and a terminal, respectively;

wherein the complex carrier demodulation device comprises: demodulators including multipliers and adders, the demodulators receive a modulated signal and demodulate the modulated signal using a complex signal as a carrier signal to obtain a complex carrier demodulated signal, wherein the complex carrier signal is generated by a circuit in the base station or the terminal and sent to the modulators, wherein the complex carrier signal is $e^{-i\omega t}$ or $e^{i\omega t}$ $e^{i\omega t}$, and wherein $e^{-i\omega t}$ and $e^{i\omega t}$ are distinguishable frequencies;

$e^{-i\omega_1 t}$ is adapted to demodulate a first modulated signal; and $e_{i\omega_2 t}$ is adapted to demodulate a second modulated signal, $\omega_1=\omega_2$, and the first modulated signal and the second modulated signal are independent information.

19. A device for transmitting a complex carrier modulated signal in a base station or a terminal, comprising a real part signal transmission unit and an imaginary part signal transmission unit; wherein the real part signal transmission unit is configured to transmit a real part signal in a complex carrier modulated signal;

and the imaginary part signal transmission unit is configured to transmit an imaginary part signal in the complex carrier modulated signal; and the real part signal and the imaginary part signal are spatially vertical; wherein the complex carrier modulated signal is obtained by:

receiving, by modulators including multipliers and adders in the base station or the terminal, a to-be-carried signal;

modulating, by the modulators, the to-be-carried signal using a complex signal as a carrier signal to obtain the complex carrier modulated signal, wherein the complex carrier signal is generated by a circuit in the base station or the terminal and sent to the modulators;

wherein the complex carrier signal is a left rotating carrier signal $e^{-\omega t}$ or a right rotating carrier signal $e^{i\omega t}$; and $e^{-\omega t}$ and $e^{i\omega t}$ are distinguishable frequencies;

wherein $e^{-\omega_1 t}$ is adapted to modulate a first to-be-carried signal, and $e^{-\omega_2 t}$ is adapted to modulate a second to-be-carried signal, wherein $\omega_1 = \omega_2$; and the first to-be-carried signal and the second to-be-carried signal are independent information.

20. The device according to claim 19, wherein the real part signal transmission unit and the imaginary part signal transmission unit are linearly polarized antennae vertical to each other in a space; or the real part signal transmission unit and the imaginary part signal transmission unit form a circularly polarized antenna.

21. A device for receiving a complex carrier modulated signal in a base station or a terminal, comprising a real part signal receiving unit and an imaginary part signal receiving unit; wherein the real part signal receiving unit is configured to receive a real part signal in a complex carrier modulated signal; and the imaginary part signal receiving unit is configured to receive an imaginary part signal in the complex carrier modulated signal; and the real part signal and the imaginary part signal are spatially vertical; wherein the complex carrier modulated signal is obtained by:

receiving, by modulators including multipliers and adders in the base station or the terminal, a to-be-carried signal;

modulating, by the modulators, the to-be-carried signal using a complex signal as a carrier signal to obtain the complex carrier modulated signal, wherein the complex carrier signal is generated by a circuit in the base station or the terminal and sent to the modulators;

wherein the complex carrier signal is a left rotating carrier signal $e^{-\omega t}$ or a right rotating carrier signal $e^{i\omega t}$; and $e^{-\omega t}$ and $e^{i\omega t}$ are distinguishable frequencies;

wherein $e^{-\omega_1 t}$ is adapted to modulate a first to-be-carried signal, and $e^{i\omega_2 t}$ is adapted to modulate a second to-be-carried signal, wherein $\omega_1 = \omega_2$; and the first to-be-carried signal and the second to-be-carried signal are independent information.

22. The device according to claim 21, wherein the real part signal receiving unit and the imaginary part signal receiving unit are linearly polarized antennae vertical to each other in a space; or the real part signal receiving unit and the imaginary part signal receiving unit form a circularly polarized antenna.

* * * * *